United States Patent
Lorey

(10) Patent No.: US 10,025,324 B2
(45) Date of Patent: Jul. 17, 2018

(54) PRESSURE REDUCER

(71) Applicant: GRAMMER AG, Amberg (DE)

(72) Inventor: Konstantin Lorey, Schmidgaden (DE)

(73) Assignee: GRAMMER AG, Amberg (DE)

( * ) Notice: Subject to any disclaimer, the term of this patent is extended or adjusted under 35 U.S.C. 154(b) by 103 days.

(21) Appl. No.: 15/036,954

(22) PCT Filed: Dec. 15, 2014

(86) PCT No.: PCT/EP2014/077805
§ 371 (c)(1),
(2) Date: May 16, 2016

(87) PCT Pub. No.: WO2015/091382
PCT Pub. Date: Jun. 25, 2015

(65) Prior Publication Data
US 2016/0291612 A1    Oct. 6, 2016

(30) Foreign Application Priority Data

Dec. 18, 2013  (DE) .................. 10 2013 021 057

(51) Int. Cl.
*G05D 11/00*       (2006.01)
*G05D 16/10*       (2006.01)
(Continued)

(52) U.S. Cl.
CPC .......... *G05D 16/106* (2013.01); *B60N 2/162* (2013.01); *B60N 2/1665* (2013.01); *B60N 2/508* (2013.01);
(Continued)

(58) Field of Classification Search
CPC .......... Y10T 137/2605; Y10T 137/261; Y10T 137/2705; Y10T 137/2546; Y10T 137/2544; Y10T 137/2642
See application file for complete search history.

(56) References Cited

U.S. PATENT DOCUMENTS 2,687,743 A * 8/1954 Huber .................... F16K 11/10
                                                  137/116.5
4,171,004 A * 10/1979 Cerrato .............. G05D 16/0663
                                                  137/115.14
(Continued)

FOREIGN PATENT DOCUMENTS

CN      101084476    12/2007
CN      101769824    7/2010
(Continued)

OTHER PUBLICATIONS

International Search Report prepared by the European Patent Office dated Apr. 14, 2015, for International Application No. PCT/EP2014/077805.

(Continued)

*Primary Examiner* — R. K. Arundale
(74) *Attorney, Agent, or Firm* — Sheridan Ross PC

(57) ABSTRACT

A pressure reducer, comprising an outer cylinder with a first air supply connector on a first end side of the outer cylinder and a second air supply connector on a second end side of the outer cylinder is provided. A piston can be guided movably in the outer cylinder. A first air chamber is arranged between the first air supply connector of the outer cylinder and the first front surface of the piston, and a second air chamber is arranged between the second air supply connector of the outer cylinder and a second front surface of the piston. The surface areas of the two front surfaces of the piston are of different size. The pressure reducer is suitable for reducing a second air pressure which prevails in the second air chamber in a pulsed manner proportionally to a first air pressure which prevails in the first air chamber, by a first air connection.

13 Claims, 3 Drawing Sheets

(51) Int. Cl.
*B60N 2/52* (2006.01)
*B60N 2/64* (2006.01)
*B60N 2/66* (2006.01)
*B60N 2/50* (2006.01)
*B60N 2/16* (2006.01)
*B60N 2/90* (2018.01)

(52) U.S. Cl.
CPC ............ *B60N 2/525* (2013.01); *B60N 2/527* (2013.01); *B60N 2/646* (2013.01); *B60N 2/66* (2013.01); *B60N 2/665* (2015.04); *B60N 2/976* (2018.02); *G05D 16/103* (2013.01); *Y10T 137/2504* (2015.04); *Y10T 137/2605* (2015.04)

(56) References Cited

U.S. PATENT DOCUMENTS

| | | | | |
|---|---|---|---|---|
| 4,194,522 | A | * | 3/1980 | Lucas ................. G05D 16/103 137/116.5 |
| 4,770,094 | A | | 9/1988 | Schiel |
| 5,395,350 | A | * | 3/1995 | Summers ............ A61M 1/0005 137/103 |
| 2009/0293492 | A1 | * | 12/2009 | Tentorio ................. F02C 7/232 60/772 |

FOREIGN PATENT DOCUMENTS

| | | |
|---|---|---|
| CN | 102279606 | 12/2011 |
| EP | 0 109 220 A1 | 5/1984 |
| JP | 2004-192462 | 7/2004 |
| JP | 2008-025711 | 2/2008 |

OTHER PUBLICATIONS

International Preliminary Report on Patentability for International (PCT) Patent Application No. PCT/EP2014/077805, dated Jun. 30, 2016, 14 pages.

Official Action for China Patent Application No. 201480057280.8, dated Jun. 30, 2017, 7 pages.

\* cited by examiner

PRESSURE REDUCER

CROSS REFERENCE TO RELATED APPLICATIONS

This application is a national stage application under 35 U.S.C. 371 and claims the benefit of PCT Application No. PCT/EP2014/077805 having an international filing date of 15 Dec. 2014, which designated the United States, which PCT application claimed the benefit of German Patent Application No. 10 2013 021 057.7 filed 18 Dec. 2013, the disclosures of each of which are incorporated herein by reference in their entirety.

FIELD

The invention relates to a pressure reducer, comprising an outer cylinder with a first air supply connector on a first end side of the outer cylinder and a second air supply connector on a second end side of the outer cylinder, and a piston which can be guided movably in the outer cylinder with a first end-side front surface and a second end-side front surface.

BACKGROUND

Pressure reducers are already known from the prior art. These devices are pressure valves or throttle valves which are installed in an existing media conducting system, i.e. they have an inlet side and an outlet side for the corresponding medium (generally gas, in particular air). In this respect, the object of pressure reducers is to ensure that, irrespective of the pressure which is prevailing on the inlet side, a permissible operating pressure on the outlet side is not exceeded. In practice, this is usually achieved by continuously measuring the pressure on the outlet side. In this respect, as the pressure increases on the outlet side, the valve is closed to an increasing extent until finally the valve is fully closed when the permissible operating pressure has been reached. Thus, in most cases, this is a safety measure and is therefore used, for example, when high system pressures are to be reduced to pressures which are required for the workplace.

Vehicle seats which have various suspension or damping options to provide the user with the greatest possible sitting comfort are also known. Thus, for example, air-assisted horizontal and vertical suspension systems can be arranged in the seat. Air-assisted systems which are arranged in the seat or in the backrest as an additional cushion are also known, these cushions being intended to support or massage the anatomy of the user, such as the lumbar portion of the spine or the gluteal muscles. The vertical deflection of the seat can be controlled, for example by a pneumatic spring and by an additionally applied damper. It goes without saying that the pressures prevailing in the mentioned systems substantially affect the suspension characteristics and damping characteristics thereof.

In this respect, the weight of the user of the seat is essential. If a driver sits on the hitherto unused seat, the system pressure in the seat increases (controlled by the level control) and thereby the pressure in the pneumatic spring increases which, for example is arranged vertically between the seat and the vehicle floor. This system pressure increases further if a relatively heavy driver sits on the seat, instead of a light driver. At the same time, due to his lower weight, the light driver requires less pressure in air-assisted systems than a heavy driver.

An adaptation of the system pressure which is possible with respect to the weight of the occupant is achievable due to level-control valves which, in the case of a vehicle seat, ensure that the system pressure is adjusted depending on the driver's weight. However, if the other systems are to be adjusted depending on the prevailing system pressure so that the ratios of the two pressures, i.e. the system pressure and the pressure in the other system, for example in the horizontal suspension, correspond to a predetermined proportionality factor, then for example a throttle valve cannot be used, because by using a throttle valve, only a specific equal pressure can ever be adjusted, but the value thereof cannot be automatically equalised in proportion to the value of the reference pressure. Therefore, a device for the automatic, proportional adaptation of air-assisted systems to different driver weights by pressure reduction is hitherto unknown from the prior art.

SUMMARY

In order to provide each individual user of an individual seat with the greatest possible comfort, the object of the present invention is to develop a device which controls the ratio of the pressures prevailing in the various components such that this ratio is constantly regulated at a predeterminable proportionality factor, and in particular a second pressure can be reduced depending on a first pressure.

The object of the invention is achieved by a pressure reducer, comprising an outer cylinder having a first air supply connector to a first end side of the outer cylinder and a second air supply connector to a second end side of the outer cylinder, and a piston which can be guided movably in the outer cylinder and has a first end-side front surface and a second end-side front surface, a first air chamber being arranged between the first air supply connector of the outer cylinder and the first end-side front surface of the piston and a second air chamber being arranged between the second air supply connector of the outer cylinder and the second end-side front surface of the piston, the surface areas of the two front surfaces of the piston differing in size, and the pressure reducer being capable of reducing in a pulsed manner a second air pressure prevailing in the second air chamber proportionally to a first air pressure prevailing in the first air chamber, in that when the piston is in a first position relative to the outer cylinder, a first air connection, consisting of two parts, is formed temporarily between the first air chamber and the second air chamber.

Due to the presently selected arrangement of different piston diameters, of spring preloading forces and appropriately designed connection lines between the chambers, a control of the prevailing pressures can be constantly carried out such that, after the control, a ratio again prevails between the two pressures, which ratio corresponds to the ratio of the front surfaces of the piston, i.e. to the predetermined ratio. Specifically, the system strives to constantly restore the equilibrium position or the neutral position respectively by means of the automatic control. This automatic control will be described in more detail further below in the description of the figures.

Thus, when a driver sits on the driver's seat, the system pressure in the seat is initially controlled by a manual level control, but preferably by an automatic level control of the system pressure. The automatic level control comprises, for example, measuring the driver's weight using suitable measuring means or sensors at the seat plate. Thereupon, the compression of the suspension, for example of a vertical pneumatic spring, which is arranged between the underside of the seat and the vehicle floor is controlled such that a comfortable suspension is possible, irrespective of the driver's weight. Thus, air is supplied to the system until the springs are in a neutral position. This adjusted system pressure is the reference pressure for the subsequent control or reduction respectively of another pressure.

If the system pressure, i.e. the pressure in the first air chamber, rises, the system no longer remains balanced because the ratio of the two pressures no longer corresponds to the predeterminable proportionality factor; the piston then moves to the second air chamber as far as a stop face, and pressure rises in the second air chamber owing to the first air connection, whereupon the piston moves back into the neutral position. The first air connection also ensures that when air is consumed at the second air supply connector, i.e. when the second pressure prevailing in the second chamber falls and the piston moves out of the neutral position towards the second chamber, i.e. when it is in the first position described above, a certain amount of air can be removed from the first chamber into the second chamber so that the piston again moves towards the neutral position and the second pressure is thus increased until the ratio between the two pressures corresponds again to the proportionality factor according to the neutral position. During permanent air consumption, this procedure is repeated time and again and the first chamber is supplied with air in pulses from the second chamber via the first air connection. In this respect, the first air chamber is always connected to an inexhaustible air supply.

A further preferred embodiment provides for a second air connection which consists of two parts and by means of which air can be removed from the second air chamber to the surroundings to be formed temporarily in a second position of the piston with respect to the outer cylinder.

The second air connection is required when there is a change of driver and the system pressure in the seat, i.e. the pressure in the first chamber, now falls because a light driver, instead of a heavy driver, sits down immediately thereafter. The ratio between the first pressure in the first chamber and the second pressure in the second chamber again no longer corresponds to the proportionality factor, but the second pressure has to be reduced. Here, the second air connection ensures that in the described situation when the piston moves out of the neutral position towards the first chamber as far as a further stop face of the outer cylinder, i.e. when it is in the above-described second position resting against the further stop face, a certain amount of air can be removed from the second chamber to the ambient air so that the piston again moves towards the neutral position until the second pressure in the second chamber has been reduced to such an extent that the ratio between the two pressures corresponds again to the proportionality factor according to the neutral position.

A further preferred embodiment provides that a channel which consists of two interconnected parts and extends inside the piston is suitable for forming the first part of the first air connection in the first position of the piston and is suitable for forming the first part of the second air connection in the second position of the piston.

Thus, this means that, in each case, a part of both the first and the second air connection is formed by a correspondingly designed channel in the piston itself, depending on the position of the piston in the cylinder. Therefore, a further air supply or a further air channel is not required. This makes it possible to design the pressure reducer according to the invention in a simple and cost-effective manner.

The second part of the first air connection is preferably formed by a bypass line. This means that in the above-described first position of the piston, the channel in the piston, as the first part of the first air connection, is directly connected to a bypass line as the second part of the first air connection. When the piston is in the first position, the channel in the piston is directly connected to the bypass line, as a result of which the first air connection between the second and the first air chamber is fully formed.

The second part of the second air connection is preferably formed by a vent line which leads out of the outer cylinder. This means that in the above-described second position of the piston, the channel in the piston, as the first part of the second air connection, is directly connected to a vent line as the second part of the second air connection. This vent line leads, for example, at an outlet opening out of the second air chamber out of the outer cylinder into the surroundings. When the piston is in the second position, the channel in the piston is directly connected to the vent line, as a result of which the second air connection between the second chamber and the surroundings is fully formed.

To adequately stabilise the piston in the cylinder and in particular to prevent fluttering or to ensure switching hysteresis respectively, it can be advantageous for a first mechanical compression spring having a first spring preloading force to be arranged between the first air supply connector of the outer cylinder and the first front surface of the piston and when a second mechanical compression spring having a second spring preloading force is arranged between the second air supply connector of the outer cylinder and the second front surface of the piston. Identical compression springs are preferably used and thus both spring preloading forces are equal in the neutral position.

These compression springs additionally support the piston in the outer cylinder by their spring forces, thereby realising a correctly guided movement of the piston. The compression springs can be provided in a more or less compressed state, depending on the position of the piston. If the compression spring is strongly compressed, for example when the second compression spring is in the first position of the piston or when the first compression spring is in the second position of the piston, the spring preloading force thereof is increased compared to the spring preloading force in the neutral position. However, if the compression spring is relaxed, for example when the second compression spring is in the second position of the piston or when the first compression spring is in the first position of the piston, the spring preloading force is lower compared to the spring preloading force in the neutral position.

The two front surfaces of the piston have different surface areas. This means that the piston consists, for example, of a first cylindrical part which is rigidly mechanically connected to a second cylindrical part of the piston. For example, the outer diameter of the second part of the piston and thereby the surface area of the second front surface of the piston is greater than the diameter of the first part of the piston and thereby greater than the surface area of the first front surface of the piston. In the neutral position of the piston, the ratio of the second front surface of the piston to the first front surface of the piston corresponds to the ratio of the first pressure in the first air chamber to the second pressure in the second air chamber.

For example, the ratio of the surface area of the second front surface of the piston to the surface area of the first front surface of the piston corresponds to a value in a range of from 1.2 to 20, preferably 2.

For example, the channel in the piston extends only in one part of the piston, i.e. only in the second part of the piston and not in the first part of the piston. An annularly formed transition surface is located at the transition between the first part of the piston and the second part of the piston, in a manner corresponding to the basic cylindrical shape of both parts. This transition surface is for example suitable for forming a stop face as the piston moves into the described second position, because it comes to a stop against a corresponding transition surface or also a stop face of the outer cylinder.

In order to cope with the different external diameters of the piston, the cavity in the outer cylinder accordingly has different internal diameters to be able to guide the piston correctly. Thus, the cavity in the outer cylinder consists substantially of a first part having a first internal diameter and a second part having a second internal diameter.

It can be advantageous for the first and second compression springs to be identical and thus in particular for them to have the same external diameter. As a result of this, but also if different compression springs having different external diameters are used, it can be advantageous if at the ends of the two air chambers the internal diameter of the cavity in the outer cylinder is adapted to the external diameter of the compression springs, thus if the cavity in the outer cylinder has, in addition to the above-mentioned first and second parts, a further third and fourth part, the internal diameters of the third and fourth part being adapted to the external diameters of the compression springs.

"Adapted" means, for example, that the external diameters of the compression springs or of the piston respectively are smaller than the internal diameters of the cavity in the outer cylinder, so that the compression springs and the piston have room, but they are only slightly smaller so that the piston can still be guided or the compression springs can still be supported respectively.

For example, the third part in the second air chamber is arranged directly at the second air supply connector. For example, directly adjoining the third part of the outer cylinder is the second part, followed thereafter by the first part. For example, adjoining the first part is the fourth part which is then necessarily arranged directly at the first air supply connector in the first air chamber. Arranged between the first part and the second part of the cavity in the outer cylinder is a first annular transition surface, which is also to be regarded as a stop face for the piston. If a third and/or a fourth part is present, then in an arrangement of the first, second, third and fourth part as described above, a second annular transition surface is also located between the third and the second part and/or a third annular transition surface is also located between the first and the fourth part.

When the piston is in the neutral position, that is to say when the two compression springs have the same spring preloading force and neither the first nor the second air connection has been formed, a hollow cylindrical cavity exists between the transition surface between the two parts of the piston and the first transition surface between the second and the first part of the cavity in the outer cylinder.

When the piston is in the first position, that is to say when the piston has moved towards the second air chamber, and when, as described above, the second compression spring is compressed, the second front surface of the piston rests against the second transition surface, for example. Depending on the size and the spring preloading force of the compression springs which are used, a spacing between the second transition surface and the second front surface of the piston may also remain. If there is no difference between the internal diameters of the piston in the second air chamber, then for example a separate third part of the cavity in the outer cylinder having a different external diameter compared with the second part of the cavity in the outer cylinder is omitted, and so the second part of the cavity in the outer cylinder is arranged such that it extends as far as the second air supply connector, then the position of the second front surface of the piston is determined by the spring preloading force of the second compression spring.

At the transition point between the two parts of the piston, the hollow cylindrical cavity between the transition surface between the two parts of the piston and the first transition surface between the second and the first part of the cavity in the outer cylinder increases because the piston has moved away from the first transition surface between the second and the first part of the cavity in the outer cylinder. According to the invention, in this position, the channel in the piston is directly connected to the bypass line, as a result of which the first air connection between the second and the first air chamber is fully formed.

When the piston is in the second position, that is to say when the piston has moved towards the first air chamber, and when, as described above, the first compression spring is compressed, then the first front surface of the piston rests against the third transition surface of the cavity in the outer cylinder, for example. Depending on the size and the spring preloading force of the compression spring which is used, a spacing between the third transition surface of the cavity in the outer cylinder and the first end face of the piston may also remain. If there is no difference between the internal diameters of the piston in the first air chamber, then for example a separate fourth part of the cavity in the outer cylinder having a different external diameter compared with the first part of the cavity in the outer cylinder is omitted, and so the first part of the cavity in the outer cylinder is arranged such that it extends as far as the first air supply connector, then the position of the first front surface of the piston is determined by the spring preloading force of the first compression spring. At the transition point between the two parts of the piston, the hollow cylindrical cavity between the transition surface between the two parts of the piston and the first transition surface between the second and the first part of the cavity in the outer cylinder decreases because the piston has moved towards the first transition surface between the second and the first part of the cavity in the outer cylinder.

An end position of the piston can be designed such that the transition surface between the two parts of the piston rests against the first transition surface between the second and the first part of the cavity in the outer cylinder. According to the invention, in this position the channel in the piston is directly connected to the vent line, as a result of which the second air connection between the second air chamber and the surroundings is fully formed. For example, the outlet opening of the vent line is arranged such that, in the second position of the piston, it leads out of the hollow cylindrical cavity between the transition surface between the two parts of the piston and the first transition surface between the second and the first part of the cavity in the outer cylinder.

Thus, the described pressure reducer can be used to control a second pressure depending on a first pressure or system pressure so that, after being controlled, the ratio of the two pressures again corresponds to a predeterminable proportionality factor. According to the invention, this proportional ratio corresponds to the reverse ratio of the front surfaces of the piston which are adjacent to the air chambers associated with the two pressures. Thus, this means that in the neutral position, the ratio between the first and the second pressure corresponds to the predetermined proportionality factor and, at the same time, the ratio between the second and the first front surface corresponds to the same predeterminable proportionality factor. Thus, in this case, the predeterminable proportionality factor can be readily predetermined by a suitable selection of the surface areas of the front surfaces, i.e. ultimately by the selection of the two external diameters of the two parts of the piston.

To be able to use the described advantages in practice, it is advantageous if the pressure reducer can be arranged between a first component associated with the first air supply connector and a second component associated with the second air supply connector.

Thus for example, the first component can be a device in a vehicle seat, in particular a level control or a vertical spring, and the second component can be a horizontal suspension, a damper, a hydraulic accumulator, a seat cushion contour adaptation or a lumbar massage system of the vehicle seat.

The vertical pneumatic spring of the vehicle seat is arranged, for example on a scissor-action frame having two scissor arms which are connected together at their centre in a rotatory manner, between the underside of the seat and the floor of the vehicle. When the seat is occupied and upon the ensuing vertical displacement of the underside of the seat, the scissor arms rotate and move towards one another, for example. This simultaneously causes an increase in the pressure in the vertical pneumatic spring which is associated with the second air supply connector.

The pressure reducer is arranged, for example, between the vertical pneumatic spring as the first component and one of the above-described systems as the second component. The piston thus moves into the first position and the control takes place as described above. The control takes place analogously thereto during a change of driver, if, for example, the first pressure falls.

For example, it may be necessary to regulate the pressure in a horizontal suspension at 75% of the system pressure in the first component, thus, for example, of the vertical suspension. The proportionality factor which, in this case, is required for the equilibrium position, thus corresponds to a value of 4/3. The same values can apply to the hydraulic accumulator and to the damper, for example. Analogously thereto, the seat cushion contour adaptation requires, for example, a regulation at 10% of the system pressure, which corresponds to a value of the proportionality factor of 10. Analogously thereto, the lumbar massage system requires, for example, a regulation at 5% of the system pressure, which corresponds to a value of the proportionality factor of 20.

To ensure that the channel in the piston is suitable for forming both the first part of the first air connection and the first part of the second air connection, it is advantageous for the parts of the channel to be cylindrical, the centre axis of the first part being arranged so as to align with the centre axis of the piston and the centre axis of the second part being arranged so as to extend perpendicularly to the centre axis of the first part, the second part being arranged so as to extend continuously through the piston. The second part is preferably arranged such that its centre axis intersects the centre axis of the piston, thus, such that it is arranged so as to extend through the piston in the thickest region thereof.

Further advantages, aims and properties of the present invention will be described with reference to the accompanying drawings and on the basis of the following description, which show and describe, by way of example, the construction and the mode of operation of a proportional pulse pressure reducer. In the drawing:

DETAILED DESCRIPTION

Figure 1:
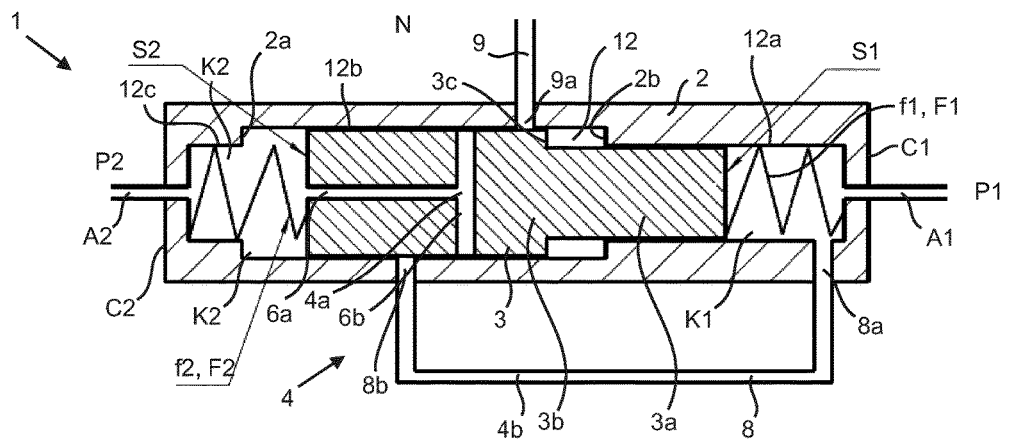
FIG. 1 is a schematic cross-sectional view of a proportional pulse pressure reducer in the neutral position.
Figure 2:
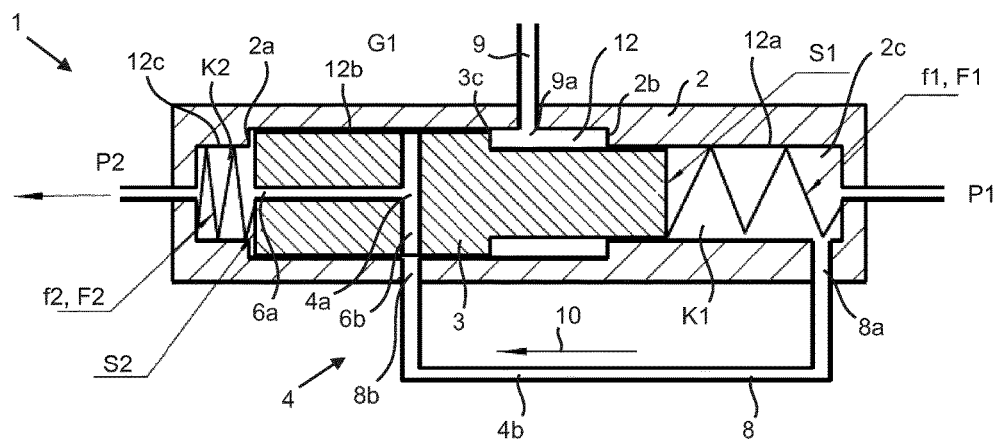
FIG. 2 is a schematic cross-sectional view of the proportional pulse pressure reducer from FIG. 1 in the position in which air is introduced.

FIG. 1 shows the pressure reducer 1 according to the invention in an equilibrium position or neutral position N respectively. In this example, the pressure reducer is constructed from an outer cylinder 2 and a piston 3 which can be guided movably therein. An air supply connector A1, A2 is arranged in each case at the two end sides C1, C2 of the outer cylinder 2. An air chamber K1, K2 is formed in each case between these air supply connections A1, A2 and the front surfaces S1, S2 of the piston. In this example, the piston 3 is stabilised in the outer cylinder 2 by two compression springs f1 and f2 having the spring preloading forces F1 and F2. Pressure P1 prevails in the first air chamber K1 and pressure P2 prevails in the second air chamber. In this respect, the outer cylinder 2 has a cavity 12 in which the piston 3 can be movably guided.

In this example, this cavity is divided into a first part 12a, a second part 12b and a third part 12c, the third part 12c being arranged at the second air supply connector A2, the second part 12b being arranged so as to directly follow the third part 12c, and the first part 12a being arranged so as to directly follow the second part. A fourth part, which could be arranged, for example, to directly follow the first part 12a next to the first air supply connector A1, is not provided in this example, i.e. the first part 12a extends as far as the first air supply connector A1. A first annular transition surface 2a is formed between the third part 12c and the second part 12b and a second annular transition surface 2b is formed between the second part 12b and the first part 12a.

The piston 3 consists of a first part 3a and of a second part 3b which are both cylindrical. In this example, the diameter and thus the front surface S2 of the second part 3b of the piston is greater than the diameter and thus the front surface S1 of the first part 3a of the piston 3. An annular transition surface 3c is formed at the transition between the first part 3a and the second part 3b of the piston.

A channel 6 which is divided into a first part 6a and a second part 6b extends in the piston 3. In this case, the first part 6a of the channel 6 is cylindrical, its centre axis being arranged so as to align with the centre axis of the piston 3. The second, also cylindrical part 6b of the channel 6 is directly connected thereto. The centre axis of the second part 6b is arranged so as to extend perpendicularly to the centre axis of the first part 6a, the second part 6b being arranged so as to extend continuously through the piston 3. In this example, the second part 6b is arranged such that its centre axis intersects the centre axis of the piston 3.

At an outlet opening 8a, a bypass line 8, which extends in the connection outside the outer cylinder 2 and leads back into the outer cylinder 2 at an inlet opening 8b, extends out of the first air chamber K1. In the neutral position N, a first air connection 4 does not exist between the first air chamber K1 and the second air chamber K2, since the piston position is arranged such that the bypass line 8 does not form a connection to the channel 6 in the piston 3 at the inlet opening 8b.

At the same time, arranged at a further outlet opening 9a is a vent line 9 which leads to the surroundings U. In the neutral position N, a second air connection 5 does not exist between the second air chamber K2 and the surroundings U, since the piston position is arranged such that the vent line 9 does not form a connection to the channel 6 in the piston 3 at the outlet opening 9a.

A cylindrical cavity is formed between the transition surface 2b between the second part 12b and the first part 12a of the cavity 12 in the outer cylinder 2 and the transition surface 3c between the first part 3a and the second part 3b of the piston. The front surfaces S1, S2 of the piston 2 are positioned at a distance from the air supply connectors A1, A2 by the preloading forces F1, F2 of the compression springs f1, f2. FIG. 1 here shows a neutral position N in which the compression springs f1, f2 are equal and are also arranged equally, i.e. in particular the spring preloading forces F1 and F2 thereof are also equal.

The equilibrium position or neutral position N of the system respectively, shown in FIG. 1, is characterised in that a proportionality factor n, where n is greater than 1 for example, describes the ratio between the surface areas S2 and S1 and also the ratio between the pressures P1 and P2.

Thus, the following applies according to equation 1:

$$\frac{S2}{S1} = n = \frac{P1}{P2} \qquad \text{[Equation 1]}$$

In the neutral position, both spring preloading forces F1 and F2 are equal. In the neutral position N, the following applies according to equation 2:

$$F1 = F2 \qquad \text{[Equation 2]}:$$

The equilibrium position or neutral position N of the system is therefore described by equation 3:

$$S1 \cdot P1 + F1 = S2 \cdot P2 + F2 \qquad \text{[Equation 3]}:$$

When the system pressure, i.e. pressure P1, increases in the first air chamber K1, and the system is no longer balanced because the ratio between the two pressures P1, P2 no longer corresponds to the predeterminable proportionality factor n, the piston 3 moves to the left towards the second air chamber K2 as far as the stop face 2a. In this illustrated example, the end position of the piston 3 is determined by the stop face 2a.

Thus, the following applies according to equation 4:

$$n < \frac{P1}{P2} \qquad \text{[Equation 4]}$$

This produces equation 5 which describes the state in the system in position G1:

$$S1 \cdot P1 + F1 = S2 \cdot P2 + F2 \qquad \text{[Equation 5]}:$$

At the same time, the piston 3 is in the first position G1 such that a first air connection 4 is formed between the bypass line 8 and the channel 6 in the piston 3. The first air connection 4 ensures that when air is consumed at the second air supply connector A2, i.e. when the second pressure P2 prevailing in the second chamber K2 falls and the piston 3 moves out of the neutral position N towards the second chamber K2, i.e. when it is in the first position G1 described above, a certain amount of air can be removed from the first chamber K1 into the second chamber K2 (arrow 10) and so the piston 3 again moves towards the neutral position N and the second pressure P2 is thus increased until the ratio between the two pressures P1, P2 again corresponds to the proportionality factor n according to the neutral position N. During permanent air consumption, this procedure is repeated time and again and the first chamber K1 is supplied in a pulsed manner with air from the second chamber K2 via the first air connection 4. In this respect, the first air chamber K1 is always connected to an inexhaustible air supply.

Figure 3:
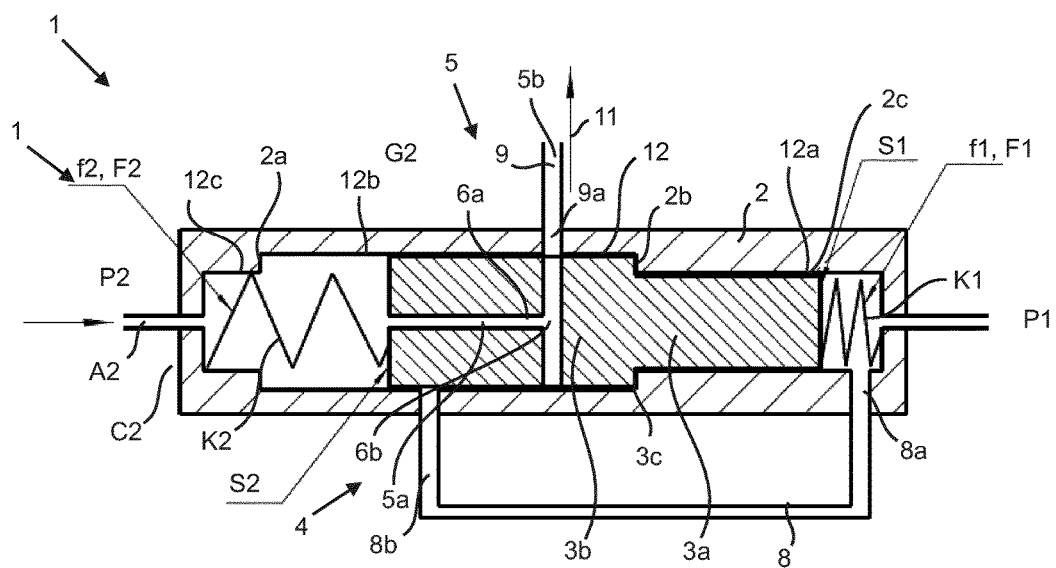
FIG. 3 is a schematic cross-sectional view of the proportional pulse pressure reducer from FIG. 1 in the venting position.

FIG. 3 describes the formation of the second air connection 5. The second air connection 5 is required when there is a change of driver and the system pressure in the seat, i.e. the pressure P1 in the first chamber K1, falls because a light driver, instead of a heavy driver, sits down immediately thereafter. The ratio between the first pressure P1 in the first air chamber K1 and the second pressure P2 in the second air chamber K2 now again no longer corresponds to the proportionality factor n, but the second pressure P2 has to be reduced. In this example, the piston 3 is positioned such that the transition surface 3c between the two parts 3a and 3b of the piston 3 is in contact with the transition surface 2b between the second part 12b and the first part 12a of the cavity 12 in the outer cylinder 2.

Thus, the following applies according to equation 6:

$$n > \frac{P1}{P2} \qquad \text{[Equation 6]}$$

This produces equation 7 which describes the state in the system in position G2:

$$S1 \cdot P1 + F1 < S2 \cdot P2 + F2 \qquad \text{[Equation 7]}:$$

At the same time, the piston 3 is in the second position G2 such that a second air connection 5 is formed between the vent line 9 and the channel 6 in the piston 3. Here, the second air connection 5 ensures that in the described situation when the piston 3 moves out of the neutral position N towards the first air chamber K1, i.e. when it is in the above-described second position G2, a certain amount of air can be removed from the second chamber K2 to the ambient air or to the surroundings U (arrow 11) and so the piston 3 again moves towards the neutral position N until the second pressure P2 in the second chamber K2 is reduced to such an extent that the ratio between the two pressures P1, P2 again corresponds to the proportionality factor n according to the neutral position N.

Figure 4:
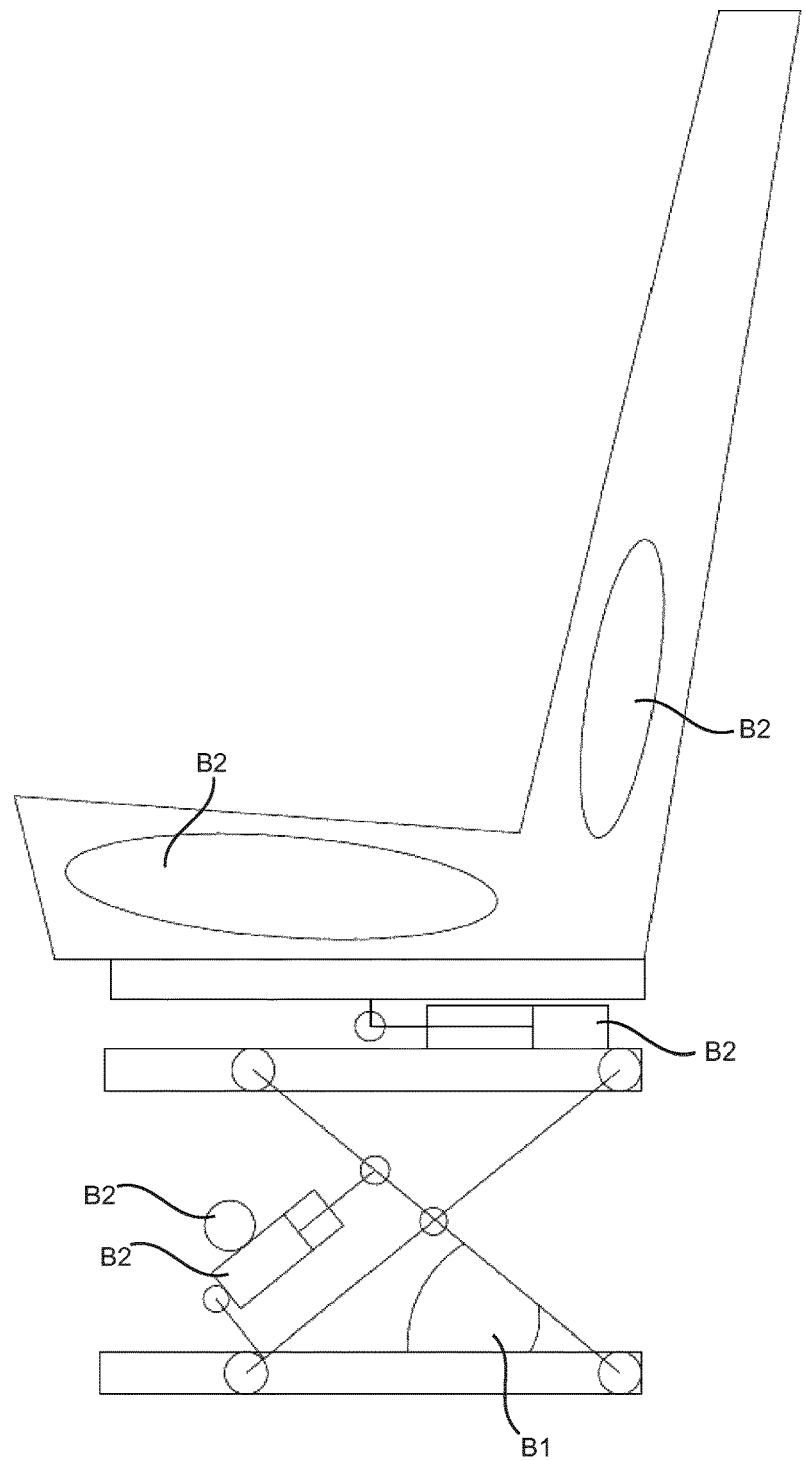
FIG. 4 shows fields of use of the pressure reducer according to the invention.

FIG. 4 shows different air-assisted systems which can, for example, be associated with a vehicle seat. Thus, the first component (B1) corresponds to a device in a vehicle seat, in particular a vertical spring, and the second component (B2) corresponds, for example, to a horizontal suspension, a damper, a hydraulic accumulator, a seat cushion contour adaptation or a lumbar massage system of the vehicle seat.

All the features disclosed in the application documents are claimed as being essential to the invention provided that, individually or in combination, they are novel over the prior art.

LIST OF REFERENCE SIGNS 1 pressure reducer
2 outer cylinder 2a transition surface (stop face)
2b transition surface (stop face)
3 piston
3a part of the piston
3b part of the piston
3c transition surface (stop face)
4 first air connection
4a first part of the first air connection (channel 6 in the piston)
4b second part of the first air connection (bypass line)
4c second air connection
5a first part of the second air connection (channel 6 in the piston)
5b second part of the second air connection (vent channel)
6 channel
6a channel portion
6b channel portion
7 third air connection, extending in the channel
8 bypass line
8a outlet opening
8b inlet opening
9 vent line
9a outlet opening
10 supplied air (arrow)
11 vent (arrow)
12 cavity in the outer cylinder
12a part of the cavity in the outer cylinder
12b part of the cavity in the outer cylinder
12c part of the cavity in the outer cylinder
12d part of the cavity in the outer cylinder
A1 air supply connector
A2 air supply connector
B1 component charged with air pressure
B2 component charged with air pressure
C1 end side of the outer cylinder
C2 end side of the outer cylinder
D1 diameter of the piston
D2 diameter of the piston
E1 end of the piston
E2 end of the piston
f1 compression spring
f2 compression spring
F1 preloading force
F2 preloading force
G1 position of the piston
G2 position of the piston
I1 inner front surface of outer cylinder
I2 inner front surface of outer cylinder
K1 chamber
K2 chamber
N neutral position
n proportionality factor
P1 air pressure
P2 air pressure

The invention claimed is:

1. A pressure reducer, comprising:
an outer cylinder with a first air supply connector on a first end side of the outer cylinder and a second air supply connector on a second end side of the outer cylinder;
a piston guided movably in the outer cylinder with a first end-side front surface and a second end-side front surface;
a first air chamber arranged between the first air supply connector of the outer cylinder and the first front surface of the piston, and a second air chamber arranged between the second air supply connector of the outer cylinder and the second end-side front surface of the piston; and
a channel having two interconnected lines and extending inside the piston, the channel forming a first part of a first air connection in a first position of the piston and forming a first part of a second air connection in a second position of the piston,
wherein the surface areas of the two front surfaces of the piston are of different size, and wherein the pressure reducer is configured to reduce a second air pressure which prevails in the second air chamber in a pulsed manner proportionally to a first air pressure which prevails in the first air chamber by the first air connection which comprises the channel and a second part of the first air connection that are configured between the first air chamber and the second air chamber temporarily in the first position of the piston with respect to the outer cylinder.

2. The pressure reducer according to claim 1, wherein the piston is in the second position relative to the outer cylinder, the second air connection comprising the channel and a second part of the second air connection is formed temporarily, by means of which the air is removed from the second air chamber to the surroundings.

3. The pressure reducer according to claim 1, wherein the second part of the first air connection is formed by a bypass line.

4. The pressure reducer according to claim 2, wherein the second part of the second air connection is formed by a vent line which leads out of the outer cylinder.

5. The pressure reducer according to claim 1, wherein a first mechanical compression spring having a first spring preloading force is arranged between the first air supply connector of the outer cylinder and the first front surface of the piston and a second mechanical compression spring having a second spring preloading force is arranged between the second air supply connector of the outer cylinder and the second front surface of the piston.

6. The pressure reducer according to claim 1, wherein the ratio of the surface area of the second front surface of the piston to the surface area of the first front surface of the piston is between 1.2 to 20.

7. The pressure reducer according to claim 1, wherein the pressure reducer is arranged between a first component associated with the first air supply connector and a second component associated with the second air supply connector.

8. The pressure reducer according to claim 7, wherein the first component is a device in a vehicle seat, and the second component is one of a horizontal suspension, a damper, a hydraulic accumulator, a seat cushion contour adaptation, and a lumbar massage system of the vehicle seat.

9. The pressure reducer according to claim 1, wherein the lines of the channel are cylindrical, the centre axis of a first line of the channel being arranged so as to align with the centre axis of the piston and the centre axis of a second line of the channel being arranged so as to extend perpendicularly to the centre axis of the first line of the channel, the second line of the channel being arranged so as to pass continuously through the piston.

10. The pressure reducer according to claim 6, wherein the ratio of the surface area of the second front surface of the piston to the surface area of the first front surface of the piston is 2.

11. The pressure reducer according to claim 8, wherein the device in the vehicle seat is one of a level control and a vertical spring.

12. A pressure reducer, comprising:

an outer cylinder with a first air supply connector on a first end side of the outer cylinder and a second air supply connector on a second end side of the outer cylinder;

a piston guided movably in the outer cylinder with a first end-side front surface and a second end-side front surface, wherein the surface areas of the two front surfaces of the piston are of different size;

a first air chamber arranged between the first air supply connector of the outer cylinder and the first front surface of the piston, and a second air chamber arranged between the second air supply connector of the outer cylinder and the second end-side front surface of the piston; and a first mechanical compression spring having a first spring preloading force arranged between the first air supply connector of the outer cylinder and the first front surface of the piston, and a second mechanical compression spring having a second spring preloading force arranged between the second air supply connector of the outer cylinder and the second front surface of the piston;

wherein the pressure reducer is configured to reduce a second air pressure that prevails in the second air chamber in a pulsed manner proportionally to a first air pressure that prevails in the first air chamber by a first air connection that comprises two parts that are configured between the first air chamber and the second air chamber temporarily in a first position of the piston with respect to the outer cylinder.

13. A pressure reducer, comprising:

an outer cylinder with a first air supply connector on a first end side of the outer cylinder and a second air supply connector on a second end side of the outer cylinder;

a piston guided movably in the outer cylinder with a first end-side front surface and a second end-side front surface, wherein the surface areas of the two front surfaces of the piston are of different size;

a first air chamber arranged between the first air supply connector of the outer cylinder and the first front surface of the piston, and a second air chamber arranged between the second air supply connector of the outer cylinder and the second end-side front surface of the piston; and a channel having two interconnected lines and extending inside the piston, wherein the lines of the channel are cylindrical, wherein the centre axis of a first line of the channel is arranged so as to align with the centre axis of the piston, wherein the centre axis of a second line of the channel is arranged to extend perpendicularly to the centre axis of the first line of the channel, wherein the second line of the channel is arranged so as to pass continuously through the piston;

wherein the pressure reducer is configured to reduce a second air pressure that prevails in the second air chamber in a pulsed manner proportionally to a first air pressure that prevails in the first air chamber by a first air connection that comprises the channel and a second part of the first air connection is configured between the first air chamber and the second air chamber temporarily in a first position of the piston with respect to the outer cylinder.

* * * * *